United States Patent
Myers et al.

(10) Patent No.: US 8,096,273 B2
(45) Date of Patent: Jan. 17, 2012

(54) ELECTROMAGNET MOUNTING AND CONTROL SYSTEM FOR A VARIABLE CAMSHAFT PHASER CONTAINING MAGNETO-RHEOLOGICAL FLUID

(75) Inventors: Jesse Myers, Waterford, MI (US); Roger Meyer, Brighton, MI (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 309 days.

(21) Appl. No.: 12/566,164

(22) Filed: Sep. 24, 2009

(65) Prior Publication Data

US 2010/0095919 A1  Apr. 22, 2010

Related U.S. Application Data

(60) Provisional application No. 61/105,830, filed on Oct. 16, 2008.

(51) Int. Cl.
*F01L 1/34* (2006.01)
(52) U.S. Cl. ...................... 123/90.17; 464/160
(58) Field of Classification Search ............... 123/90.15, 123/90.17; 464/160, 161
See application file for complete search history.

(56) References Cited

U.S. PATENT DOCUMENTS

| 4,920,929 A * | 5/1990 | Bishop | 123/41.49 |
| 7,051,688 B2 * | 5/2006 | Lancefield | 123/90.15 |

FOREIGN PATENT DOCUMENTS

| DE | 10233044 | 2/2004 |
| WO | 03048530 | 6/2003 |

* cited by examiner

*Primary Examiner* — Thomas Denion
*Assistant Examiner* — Daniel Bernstein
(74) *Attorney, Agent, or Firm* — Volpe and Koenig, P.C.

(57) ABSTRACT

A magneto-rheological fluid controlled camshaft phaser is provided having a stator with inwardly directed projections which define working spaces therebetween. The stator is adapted to be connected to the crankshaft via a timing gear and chain. A rotor is located radially inside the stator and is connected to the camshaft. Rotor lugs extend radially outwardly from the rotor into the working spaces, dividing them into first and second chambers on each side of the rotor lugs. A magneto-rheological fluid is located in the chambers, and the chambers on each side of each rotor lug are connected via a clearance space between the radially outer surface of the lugs and the inner surface of the stator located between the projections. The rotor is connected to the camshaft. An electromagnetic assembly is mounted adjacent to the stator and includes at least one electromagnet along with at least one ferrous focusing piece. In one embodiment, a plurality of the electromagnets are axially spaced apart from the working chambers holding the magneto-rheological fluid. In another embodiment the electromagnetic is formed by a coil which is radially spaced apart from the working chambers holding the magneto-rheological fluid. In each case, the magnetic field is passed from the electromagnet(s) and the ferrous focusing piece(s) into the phaser via a small air gap spacing between the electromagnet assembly and the moving camshaft phaser.

6 Claims, 4 Drawing Sheets

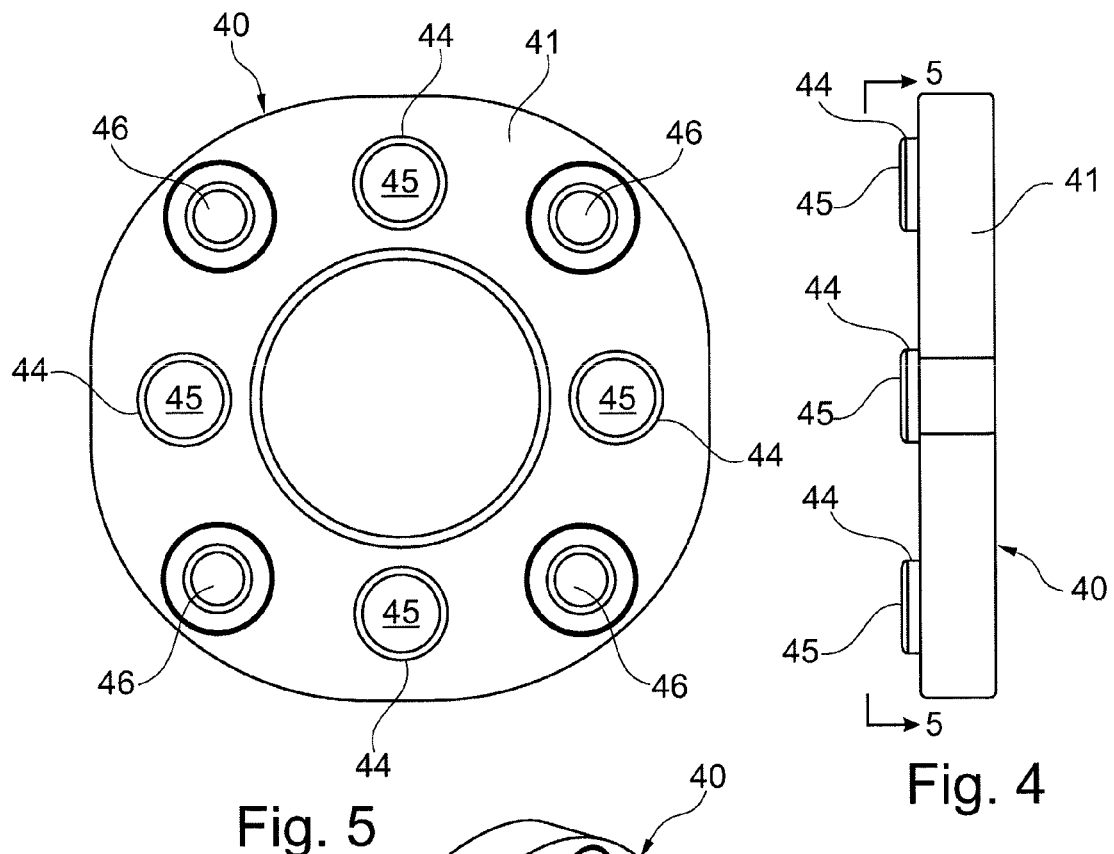
Fig. 5
Fig. 4
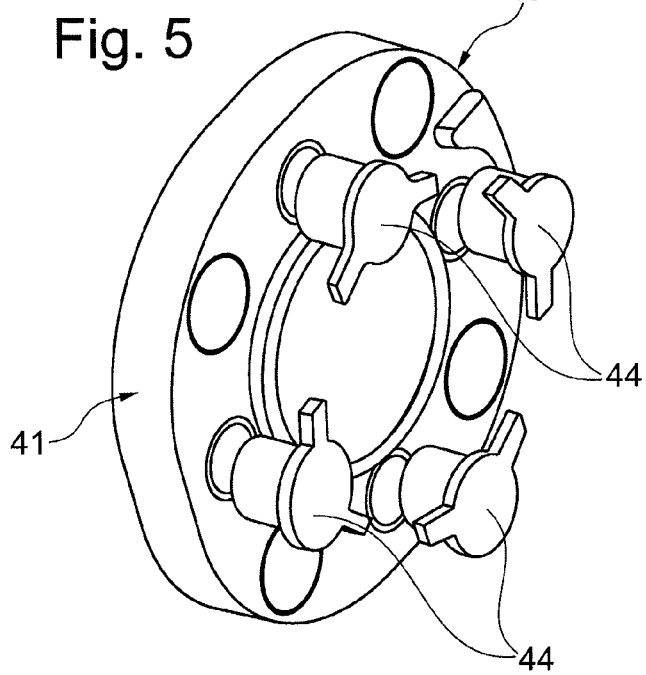
Fig. 6

ELECTROMAGNET MOUNTING AND CONTROL SYSTEM FOR A VARIABLE CAMSHAFT PHASER CONTAINING MAGNETO-RHEOLOGICAL FLUID

CROSS-REFERENCE TO RELATED APPLICATIONS

This application claims the benefit of U.S. Provisional Application No. 61/105,830, filed Oct. 16, 2008, which is incorporated herein by reference as if fully set forth.

BACKGROUND

Camshaft phase shifting mechanisms that vary the rotational angle position of a camshaft relative to a crankshaft of an internal combustion engine using pressurized hydraulic fluid to control a rotary actuator, typically using engine oil supplied by the oil pump, are known. However, such hydraulically actuated phasers can have a high oil demand, and the performance can vary depending upon the temperature of the engine oil. Further, such systems require oil flow control valves and complex passages for leading the pressurized hydraulic fluid from the engine oil supply to the rotating, hydraulically actuated camshaft phasing assembly.

In order to address the shortcomings of such pressurized hydraulic fluid actuated camshaft phasing assemblies, it has also been proposed to use a closed hydraulic circuit in an engine camshaft phaser in which the hydraulic circuit employs a magneto-rheological fluid as a hydraulic pressure medium. This is disclosed in PCT/GB02/05464. In this disclosure, a camshaft phaser is provided having a rotor attached to the camshaft and a stator connected to the crankshaft via a timing chain and gear. Hydraulic working chambers are located on opposing sides of two vanes which extend from the rotor into working chambers defined in the stator. The magneto-rheological fluid flows freely between the chambers via passages which connect opposing chambers. The flow of the magneto-rheological fluid through the passage is controlled by the selective application of a magnetic field.

Magneto-rheological fluids are materials that respond to an applied magnetic field with a change in their properties. In this case, the application of a magnetic field causes the magneto-rheological fluid to increase greatly in viscosity to a virtual solid state. Magneto-rheological fluids have a very fast response time and their flow properties change within milliseconds of application or removal of the magnetic field. One example is MRF-122EG from Lord Corp.

In the case of a camshaft phaser, as the rotor, which is typically connected with the camshaft, fluctuates in position relative to the stator within a defined rotational angle based on the travel available to the vanes in the working chambers, when a desired position is achieved, the electromagnet is actuated and the position of the rotor is hydraulically locked relative to the stator due to the passage between the chambers being blocked by the change of state of the magneto-rheological fluid in response to the magnetic force being applied.

DE 102 33 044 A1 also discloses a magneto-rheological fluid actuated camshaft adjuster in which passages between the working chambers are provided via openings defined through the vanes of the rotor. However, in these known prior art devices, it is necessary to provide current to the electromagnet as it rotates with the camshaft adjuster. Further, these prior art solutions change from a low viscosity fluid state when no electromagnetic force is applied to a nearly solid state when the electromagnetic force is applied, making controlled shifting of the phase position of the camshaft relative to the crankshaft more complicated.

SUMMARY

The present invention provides a camshaft phaser using magneto-rheological fluid to maintain the angular position between the camshaft and the crankshaft of an internal combustion engine which addresses these issues with the prior art.

In a first preferred embodiment of the invention, the camshaft phaser includes a stator having inwardly directed projections which define working spaces therebetween. The stator is adapted to be connected to the crankshaft via a timing gear and chain. A rotor is located radially inside the stator and is connected to the camshaft. Rotor lugs extend radially outwardly from the rotor into the working spaces, dividing them into first and second chambers on each side of the rotor lugs. A magneto-rheological fluid is located in the chambers, and the chambers on each side of each rotor lug are connected via a clearance space between the radially outer surface of the lugs and the inner surface of the stator located between the projections. The rotor is connected to the camshaft, preferably via a central bolt. An electromagnetic assembly is mounted adjacent to the stator and includes at least one electromagnet along with at least one ferrous focusing piece. In the first embodiment, a plurality of the electromagnets are axially spaced apart from the working chambers holding the magneto-rheological fluid. In a second preferred embodiment the electromagnetic is formed by a coil which is radially spaced apart from the working chambers holding the magneto-rheological fluid. In each case, the magnetic field is passed from the magnet and the ferrous focusing piece into the phaser via a small air gap spacing between the electromagnet assembly and the moving camshaft phaser.

The electromagnet(s) are connected to the engine control unit (ECU) and are activated using pulse width modulation (PWM) signals. As the signals increase from 0% to a maximum of 100%, the viscosity of the magneto-rheological fluid becomes thicker, until it is nearly solid at 100% PWM signal. This allows the position of the rotor to be adjusted relative to the stator with some control by continuously adjusting the viscosity of the magneto-rheological fluid using the ECU. As the movement of the rotor relative to the stator occurs based on the camshaft torsional forces provided via engagement and disengagement of the cam lift surfaces with the respective lifters, in a 0% PWM signal state, this can result in rapid fluctuation between the maximum adjustment positions of the rotor relative to the stator, which is limited only by the stops created by the stator projections. Using the PWM signal control and gradually increasing the signal from 0% to gradually increase the viscosity of the magneto-rheological fluid prevents such rapid fluctuating movements of the rotor relative to the stator and, using feedback position sensing of the camshaft to the ECU, allows the ECU to lock the rotor (and hence the camshaft) into a desired position with a higher accuracy.

In the first preferred embodiment, the electromagnets are held via a mounting plate spaced axially apart from the phaser.

In the second preferred embodiment, the mounting plate holds the electromagnet in a radially spaced apart position around the camshaft phaser.

Preferably, the spaces between the stator and rotor are sealed using o-ring and/or combination o-ring/lip seals in order to prevent the magneto-rheological fluid from escaping from the phaser as well as to prevent air from entering the phaser. The mounting plates for the electromagnets can be made of any suitable metallic or polymeric material, and may be molded.

In the second embodiment of the invention with the radially spaced electromagnet, preferably the support plate includes a support ring that is spaced apart from the radial outer surface of the stator and in or upon which an electromagnetic coil is wound. A ferrous focusing ring is mounted inside the support ring to focus the electromagnetic field toward the working chambers with the magneto-rheological fluid.

In the both preferred embodiments, an alignment feature is provided for accurate placement of the electromagnetic support assembly around the phaser 10. In one preferred embodiment, this alignment feature is designed to wear off rapidly, and may be made of a low density polymeric material.

BRIEF DESCRIPTION OF THE DRAWINGS

The foregoing summary and the following detailed description will be better understood when read in conjunction with the appended drawings, which illustrate preferred embodiments of the invention. In the drawings:

FIG. 4 is a right side elevational view of the electromagnetic assembly of FIG. 3;

FIG. 5 is a front elevational view of the electromagnetic assembly taken along lines 5-5 in FIG. 4;

FIG. 6 is a rear perspective view, partially disassembled, showing assembly of the electromagnets into the mounting plate of the electromagnetic assembly of FIG. 3;

DETAILED DESCRIPTION OF THE PREFERRED EMBODIMENTS

Figure 2:
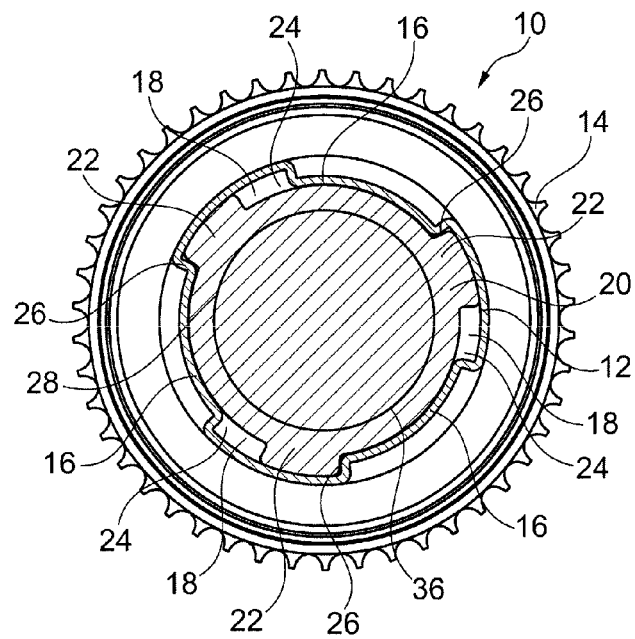
FIG. 2 is a cross-sectional view through the phaser of FIG. 1 taken along the lines 2-2 in FIG. 1.

Certain terminology is used in the following description for convenience only and is limiting. The words "front," "rear," "upper" and "lower" designate directions in the drawings to which reference is made. The words "inwardly" and "outwardly" refer to the directions toward and away from the parts referenced in the drawings. A reference to a list of items that are cited as "at least one of a, b or c" (where a, b or c represent the items being listed) means any single one of the items a, b or c, or combinations thereof. The terms "camshaft", "phaser" and "adjuster" are used interchangeably. Magneto-rheological fluid is also referred to as "MR fluid." The terminology includes the word specifically noted above, derivatives thereof and words of similar import.

Referring to FIGS. 1-6, a first embodiment of a magneto-rheologically actuated camshaft phaser 10 is shown. As show in detail in FIGS. 1 and 2, the camshaft phaser 10 includes a stator 12 which is connected to a timing gear or pulley 14 for connection to the crankshaft of an internal combustion engine via a traction element, such as a timing chain or belt, or a gear stage drive. As shown most clearly in FIG. 2, the stator 12 includes inwardly directed projections 16 which define working spaces 18 for the magneto-rheological fluid. A rotor 20 is located within the stator 12 and includes an outer surface on which the inwardly directed projection 16 of the stator are slidingly supported. Rotor lugs 22 extend radially outwardly from the rotor 20 into the working spaces 18 defined by the stator 12, dividing the working spaces 18 into a first set of chambers 24 and a second set of chambers 26, with the first and second sets of chambers 24, 26 being located on opposite sides of the rotor lugs 22. While three sets of chambers 24, 26 and lugs 22 are shown, this number can be varied. The rotor 20 preferably includes a timing pin 28 which can be received in the front end of a camshaft 30 of an internal combustion engine, as shown in the phantom lines in FIG. 1. A helical spring 32 is connected between the stator 12 and the rotor 20 in order to equalize the force required to advance or retard a timing position of the rotor 20 relative to the stator 12. The spring 32 is held to the rotor 20 via a spring retainer 34 which preferably also acts as a trigger wheel for a position or timing sensor 52 connected to the engine control unit (ECU) 50. Preferably, a space is provided between the radially outer surface of the rotor lugs 22 and the inner surface of the stator 12 in the working spaces 18 as shown in FIG. 2. This allows the MR fluid to move between the first set of chambers 24 and the second set of chambers 26 when no electromagnetic field is applied and the MR fluid has a low viscosity.

Preferably, the timing gear 14, the stator 12 and the rotor 20 are formed of non-ferromagnetic material, such as aluminum, in order not to interfere with the magnetic circuit described in more detail below. The MR fluid fills the first and second sets of chambers 24, 26. Preferably seals 36 are disposed on each side of the rotor 20 in order to seal the first and second sets of chambers 24, 26 to prevent the MR fluid from escaping. The seals 36 can be o-ring seals, lip seals or a combination of an o-ring seal including one or more lip seals extending therefrom, as illustrated.

Figure 1:
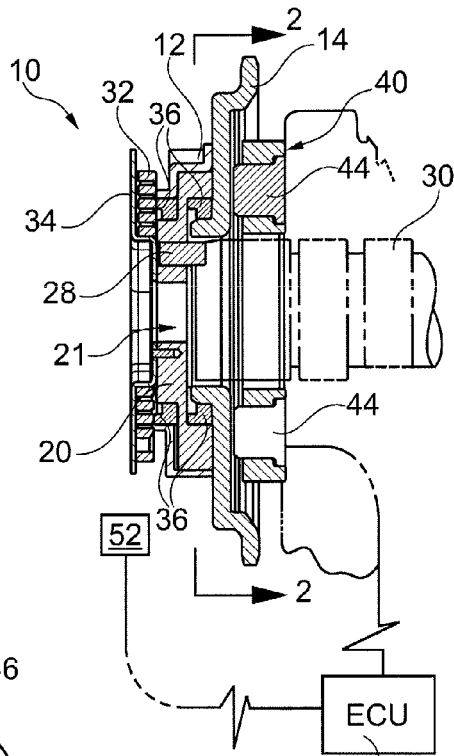
FIG. 1 is a axial cross-sectional view of a magneto-rheological fluid actuated camshaft phaser assembly according to the present invention.
Figure 3:
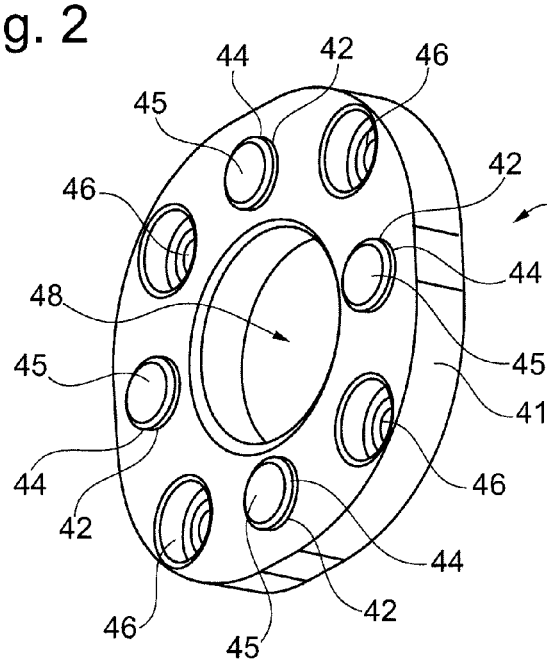
FIG. 3 is a perspective view of an electromagnetic assembly of the camshaft phaser of FIG. 1.
Figure 7:
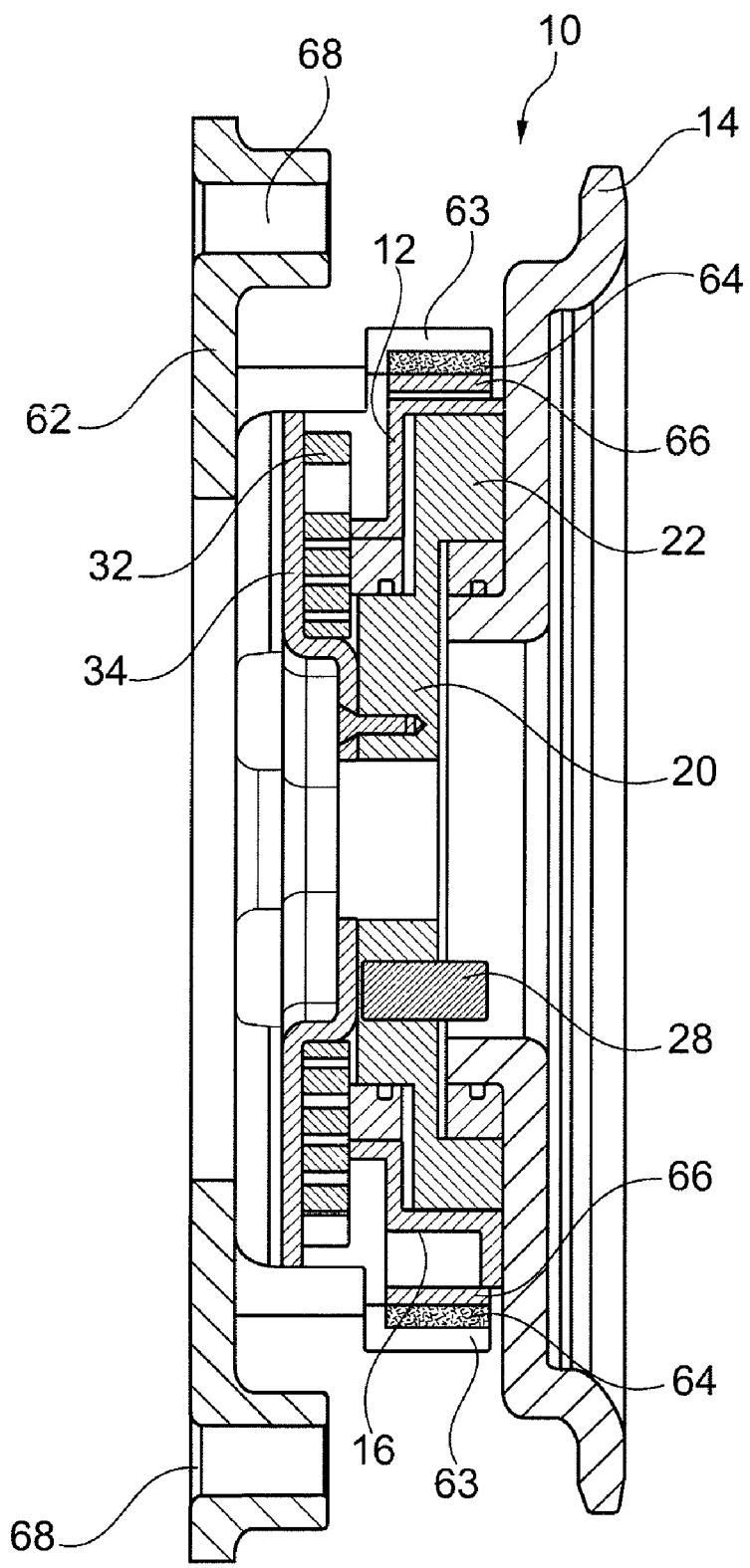
FIG. 7 is a cross-sectional view through a magneto-rheological fluid actuated camshaft phaser shown in FIG. 1 with a second embodiment of an electromagnetic assembly.

As shown in detail in FIG. 1, an electromagnetic assembly 40 is mounted to the engine behind the camshaft phaser 10. The electromagnetic assembly 40 includes a mounting plate 41 having a plurality of electromagnets 44 located in magnet mounting holes 42. Ferrous focusing discs 45 are located on the camshaft phaser facing sides of the electromagnets 44. Mounting holes 46 are provided in the plate 41 for mounting the electromagnetic assembly 40 to the engine in a position behind the camshaft phaser 10. A clearance opening 48 is provided into which the front of the camshaft 30 extends for attachment to the rotor 20 of the camshaft phaser 10. The electromagnets 44 are preferably inserted from the backside of the plate 41, and the ferrous focusing discs 45 for focusing the electromagnetic radiation are located on the front side in close proximity to stator 12.

As shown in FIG. 1, the rear wall of the stator 12 is preferably formed via the timing gear wheel, and the electromagnets 44 are placed with a small axial clearance to allow rotation of the phaser 10 within contacting the ferrous discs 45. The placement of the electromagnets 44 is directly aligned with the working chambers 24, 26 and, based on the rotational speed of the phaser, four uniformly spaced electromagnets is believed to be sufficient for maintaining the state of the MR fluid when the electromagnets 44 are activated by the PWM signal from the ECU.

Figure 10:
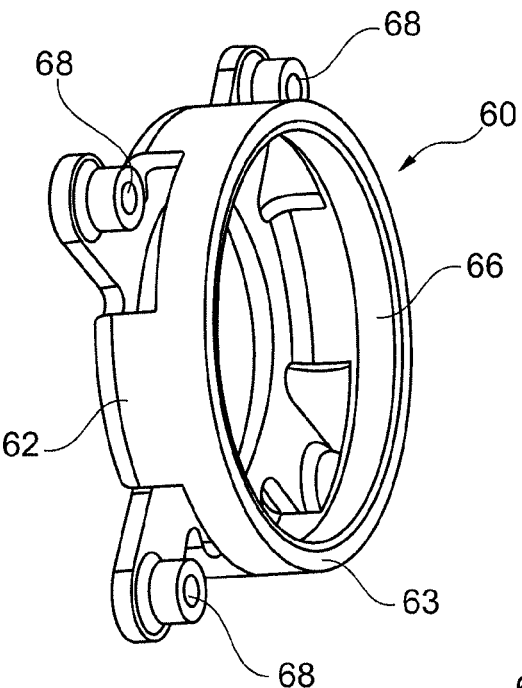
FIG. 10 is a rear perspective view of the electromagnetic assembly shown in FIG. 8.
Figure 8:
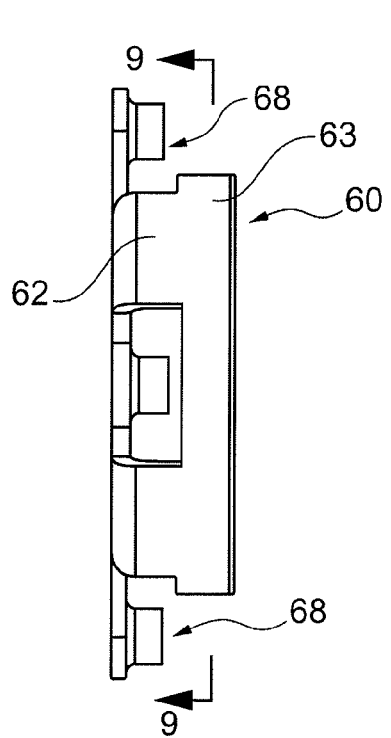
FIG. 8 is an elevational view of the second embodiment of the support assembly shown in FIG. 7.
Figure 9:
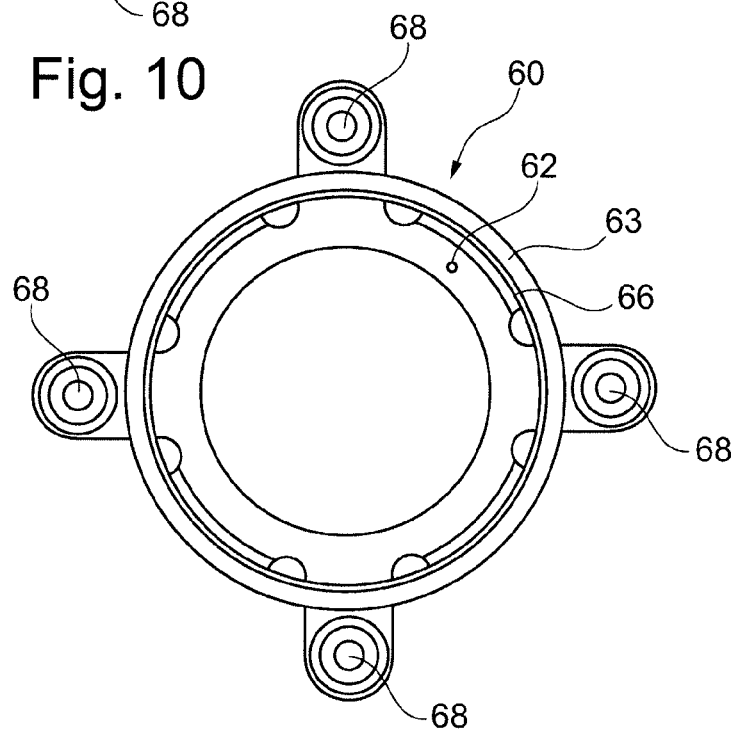
FIG. 9 is a rear elevational view of the support assembly shown in FIG. 8.

A second embodiment of the invention is shown in FIGS. 7-10, in which the phaser 10 is as described above. However, in this case the electromagnet assembly 60 provides a single ring-shaped electromagnet that entirely radially encompasses the stator 12 of the phaser 10 in the region of the working chambers 24, 26. As shown in FIGS. 8-10, the electromagnet assembly 60 includes a housing 62 having mounting holes 68 for mounting the electromagnet assembly in position at the front of the camshaft phaser 10. The housing 62 includes a support ring 63 in or around which the electromagnetic coil 64 is wound. A ferrous focusing ring 66 is radially inwardly located from the coil 64 and is used to focus the electromagnetic radiation toward the first and second sets of chambers 24, 26 in order to activate the MR fluid. The housing 62 can be made of a non-ferrous or polymeric material and can be cast or molded.

In view of the small radial clearance desired between the ferrous ring 66 and the outside of the stator 12, the electromagnet support assembly 60 must be closely aligned with the phaser 10 to prevent interference or contact between the phaser 10 and the ferrous ring 66. This can be accomplished with thin, wear away spacers which are located on the ferrous disks 45 or the ferrous ring 66, which are preferably a low density polymeric material.

In operation, the separate electromagnets 44 of the electromagnet assembly 40 or the electromagnetic coil 64 of the electromagnet assembly 60 are connected to the ECU for the engine, and the magnetic field strength is varied by the ECU 50 from 0% to 100% using a PWM signal from the ECU 50. The position of the rotor 20 (and hence the camshaft) relative to the stator 12 is measured via the sensor 52 from the trigger wheel 34. The ECU actuates the electromagnet(s) 44, 64 using the PWM signal from the ECU 50. The signal can be increased from 0%, at which the MR fluid is at its lowest viscosity, to a maximum of 100%, where the viscosity of the MR fluid becomes so high that the fluid is nearly solid at 100% PWM signal. With the 100% PWM signal, the phase angle position between the rotor 20 and the stator 12 is fixed.

The electromagnetic radiation from the electromagnet(s) 44, 64 passes either through the radial cover or end face of the stator 12 to the first and second sets of chambers 24, 26 in order to activate the MR fluid. By slowly increasing the PWM signal to the electromagnet(s) 44, 64, the viscosity of the MR fluid can be gradually increased. This has the advantage of acting as a variable effect damper to damp the movements created between the rotor and the stator due to the different forces experienced by the camshaft 30 during its rotation. During the engine cycle, the camshaft experiences reversing torques that act alternately in directions to advance and to retard the phase of the camshaft relative to the crankshaft depending upon whether the cams on the camshaft are in a lift cycle (to open a valve) or a closing cycle (allowing the valve to close via the valve spring). If the PWM signal is at 0% to the electromagnet(s) 44, 64, the rotor 20 is allowed to move freely by the MR fluid passing between the first and second sets of chambers 24, 26 via the space between the radially outer surface of the rotor lugs 22 and the facing inner surface of the stator 12. As the PWM signal to the electromagnet(s) 44, 64 increases from 0%, the viscosity of the MR fluid increases, creating a greater damping action, slowing the alternating movement of the rotor 20 due to the alternating torques experienced by the camshaft 30. The position/timing sensor 52 continuously reads the position of the camshaft 30 and, based on input regarding the position of the crankshaft, it can increase the PWM signal as required, creating a greater damping effect by the MR fluid and allowing the position of the rotor 20 to be more accurately measured due to the higher damping of the movement. As the desired timing position is reached, the PWM signal increases to 100%, changing the state of the MR fluid to a nearly solid form in a matter of milliseconds, thus locking the angular position of the rotor 20 relative to the stator 12.

In a preferred embodiment of the invention, the outer cover of the stator 12 is formed as a deep drawn aluminum part which can be welded, mechanically fastened or otherwise connected to the timing gear 14.

This arrangement provides a MR fluid actuated camshaft phaser 10 that allows dependable, accurate and reliable positioning of a camshaft phase angle relative to a crankshaft without the use of pressurized engine oil. This avoids the changes in operation seen in the previously known hydraulically actuated camshaft phasers due to changes in oil temperature. As the MR fluid controlled phaser 10 is entirely independent of the engine oil circuit, it provides improved phaser performance.

Both embodiments of the invention also address the need to activate the MR fluid within the rotating phaser 10 from a stationary electromagnet connected to the ECU in order to receive the PWM signal.

Those skilled in the art will appreciate that various modifications can be made to the MR fluid controlled phaser 10 as well as the electromagnet assemblies 40 and 60 described above which would still fall within the scope of the present invention.

What is claimed is:

1. A magneto-rheological fluid controlled camshaft phaser for controlling a phase angle position of a camshaft, the phaser comprising:
   a stator with inwardly directed projections which define working spaces therebetween;
   a rotor located radially inside the stator and is adapted to be connected to the camshaft, rotor lugs extend radially outwardly from the rotor into the working spaces, dividing them into first and second chambers on each side of the rotor lugs;
   a magneto-rheological fluid located in the chambers, and the chambers on each side of each rotor lug are connected via a clearance space between a radially outer surface of the rotor lugs and an inner surface of the stator located between the projections; and
   an electromagnetic assembly mounted adjacent to the stator and including at least one electromagnet along with at least one ferrous focusing piece.

2. The magneto-rheological fluid controlled camshaft phaser of claim 1, wherein the at least one electromagnet comprises a plurality of the electromagnets that are axially spaced apart from the working chambers holding the magneto-rheological fluid.

3. The magneto-rheological fluid controlled camshaft phaser of claim 1, wherein the at least one electromagnet comprises a coil which is radially spaced apart from the working chambers holding the magneto-rheological fluid.

4. The magneto-rheological fluid controlled camshaft phaser of claim 1, wherein a magnetic field is passed from the at least one electromagnet and the at least one ferrous focusing piece into the phaser via a small air gap spacing between the electromagnet assembly and the camshaft phaser.

5. The magneto-rheological fluid controlled camshaft phaser of claim 1, further comprising a trigger wheel and a sensor for determining a camshaft position.

6. The magneto-rheological fluid controlled camshaft phaser of claim 1, wherein the at least one electromagnet comprises a support plate or housing in which the at least one electromagnet is mounted, the support plate or housing being adapted for connection to an internal combustion engine.

* * * * *